(12) United States Patent
Farkash (10) Patent No.: US 6,841,287 B2
(45) Date of Patent: Jan. 11, 2005

(54) VARIABLE PRESSURE DROP PLATE DESIGN

(75) Inventor: Ron H. Farkash, Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 412 days.

(21) Appl. No.: 10/004,713

(22) Filed: Dec. 5, 2001

(65) Prior Publication Data
US 2002/0110723 A1 Aug. 15, 2002

Related U.S. Application Data

(60) Provisional application No. 60/257,849, filed on Dec. 21, 2000.

(51) Int. Cl.$^7$ .......................... H01M 2/14; H01M 2/00; H01M 2/02
(52) U.S. Cl. .............................. 429/38; 429/34; 429/39
(58) Field of Search ................................ 429/34, 38, 39

(56) References Cited

U.S. PATENT DOCUMENTS 4,124,478 A * 11/1978 Tsien et al. .................. 204/255
5,543,240 A * 8/1996 Lee et al. ..................... 429/38

* cited by examiner

Primary Examiner—Patrick Ryan
Assistant Examiner—Julian Mercado
(74) Attorney, Agent, or Firm—Fish & Richardson P.C.

(57) ABSTRACT

A fuel cell electrode includes a plate having a front surface and a back surface and also having a plurality of gas delivery holes and a plurality of gas exhaust holes formed through the plate. The front surface of the plate has a plurality of open gas distributions channels, a first portion of which is connected at one end to a first one of the plurality of gas delivery holes and at another end to a first one of the plurality of gas exhaust holes, a second portion of which is connected at one end to a second one of the plurality of gas delivery holes and at another end to a second one of the plurality of gas exhaust holes, and a third portion of which is connected at one end to said second one of the plurality of gas delivery holes and at another end to said first one of the plurality of gas exhaust holes.

16 Claims, 5 Drawing Sheets

VARIABLE PRESSURE DROP PLATE DESIGN

CROSS REFERENCE TO RELATED APPLICATIONS

This application claims priority under 35 USC §119 to U.S. provisional application Ser. No. 60/257,849, "VARIABLE PRESSURE DROP PLATE DESIGN," filed Dec. 21, 2000.

BACKGROUND OF THE INVENTION

This invention relates to fuel cells and to fluid flow plates within fuel cells.

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell system made up of multiple fuel cells also typically includes one or more coolant flow field plates disposed adjacent the exterior of the anode flow field plates and/or the exterior of the cathode flow field plates.

Each flow field plate has an inlet region, an outlet region, and open-faced channels connecting the inlet region to the outlet region and providing a way for distributing the gases to the membrane electrode assembly.

The membrane electrode assembly usually includes a solid electrolyte, e.g., a proton exchange membrane (PEM), between a first catalyst and a second catalyst. One gas diffusion layer is between the first catalyst and the anode flow field plate, and the other gas diffusion layer is between the second catalyst and the cathode flow field plate.

During operation of the fuel cell, a reactant gas, e.g., hydrogen, enters the anode flow field plate at the inlet region of the anode flow field plate and flows through the channels of the anode flow field plate toward the outlet region of the anode flow field plate. The other gas, e.g., air, enters the cathode flow field plate at the inlet region of the cathode flow field plate and flows through the channels of the cathode flow field plate toward the cathode flow field plate outlet region.

As the reactant gas flows through the channels of the anode flow field plate, the reactant gas passes through the anode gas diffusion layer and interacts with the anode catalyst. Similarly, as the other gas flows through the channels of the cathode flow field plate, the other gas passes through the cathode gas diffusion layer and interacts with the cathode catalyst.

The anode catalyst interacts with the reactant gas to catalyze the conversion of the reactant gas to reaction intermediates. The reaction intermediates include ions and electrons. The cathode catalyst interacts with the other gas and the reaction intermediates to catalyze the conversion of the other gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the reactant gas undergoes oxidation during the fuel cell reaction. Electrons are consumed at the cathode side of the membrane electrode assembly, indicating that the other gas undergoes reduction during the fuel cell reaction.

For example, when hydrogen and oxygen are the two gases that are used in the fuel cell, the hydrogen flows through the anode flow field plate and undergoes oxidation. The oxygen flows through the cathode flow field plate and undergoes reduction. The specific reactions that occur in the fuel cell are represented in the following Eqs. 1–3:

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

As shown in Eq. 1, the hydrogen forms protons ($H^+$) and electrons ($e^-$). The protons flow through the electrolyte to the cathode side of the membrane electrode assembly, and the electrons flow from the anode side of the membrane electrode assembly to the cathode side of the membrane electrode assembly through the external load. As shown in Eq. 2, the electrons and protons react with the oxygen to form water. Eq. 3 shows the overall fuel cell reaction.

In addition to forming chemical products, the fuel cell reaction produces heat. One or more coolant flow field plates are typically used to conduct the heat away from the fuel cell and maintain appropriate stack temperatures.

Each coolant flow field plate has an inlet region, an outlet region, and channels that provide fluid communication between the coolant flow field plate inlet region and the coolant flow field plate outlet region. A coolant, e.g., liquid de-ionized water or other low conductivity fluids, at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY OF THE INVENTION

In one aspect of the invention, a fuel cell electrode includes a plate having a front surface and a back surface and also having a plurality of gas delivery holes and a plurality of gas exhaust holes formed through the plate, the front surface of the plate having a plurality of open gas distributions channels, a first portion of which is connected at one end to a first one of the plurality of gas delivery holes and at another end to a first one of the plurality of gas exhaust holes, a second portion of which is connected at one end to a second one of the plurality of gas delivery holes and at another end to a second one of the plurality of gas exhaust holes, and a third portion of which is connected at one end to said second one of the plurality of gas delivery holes and at another end to said first one of the plurality of gas exhaust holes.

In another aspect of the invention, a fuel cell system includes a plurality of fuel cells stacked together, each having a first electrode, a second electrode, and a membrane sandwiched between the first and second electrodes, wherein each first electrode includes a plurality of gas distribution channels on a surface thereof. The fuel cell system also includes a plurality of gas delivery manifolds, each of which is connected to the plurality of channels of each of the plurality of first electrodes, and a plurality of gas exhaust manifolds, each of which is connected to the plurality of channels of each of the plurality of first electrodes, wherein on the first electrode of each of the plurality of fuel cells, a first portion of the plurality of gas distribution channels is connected at one end to a first one of the plurality of gas delivery manifolds and at another end to a first one of the plurality of gas exhaust manifolds, a second portion of the plurality of gas distribution channels is connected at one end to a second one of the plurality of gas delivery manifolds and at another end to a second one of the plurality of gas exhaust manifolds, and a third portion of the plurality of gas distribution channels is connected at one end to said second one of the plurality of gas delivery manifolds and at another end to said first one of the plurality of gas exhaust manifolds.

One or more of the following advantages may be provided by one or more aspects of the invention.

The invention enables one to operate a fuel cell over a broad range of fluid flow rates while still keeping the pressure drop across fluid flow plates in the fuel cell within an acceptable operating range. When operating at high flow rates, the multiple input manifolds are operated as a single supply manifold and the multiple output manifolds are operated as a single output manifold. In this configuration, the gas flows from the single input manifold, through the fluid flow field, and out the single output manifold. When operating at low flow rates, the multiple input manifolds are operated as separate manifolds, as are the multiple output manifolds. In this configuration, the gas flows from one of the input manifolds, through the fluid flow field, and into one of the output manifolds. This output manifold is closed at both ends, so the gas flows back through the fluid flow field to another one of the input manifolds. This input manifold is closed at both ends, so the gas flows back through the fluid flow field to another output manifold. The gas continues flowing through the fluid flow field between different input and output manifolds until the gas enters an output manifold open at one end, allowing the gas to exit the fuel cell system.

Providing multiple input and output manifolds also presents an opportunity for water to drop out of the flow through the fuel cell plates. When the fuel becomes redirected back into a fuel cell plate's flow channels at an input or output manifold, water tends to drop out of the fuel and into the manifold before the fuel returns to the fuel cell stack. Thus, the amount of water passing through the fuel cell stack decreases, lowering the chance of water clogging the flow channels.

The same design can be used in the air input and output manifolds of the fuel cell stack.

Other features and advantages of the invention will be apparent from the detailed description and the drawings.

DETAILED DESCRIPTION

Figure 1:
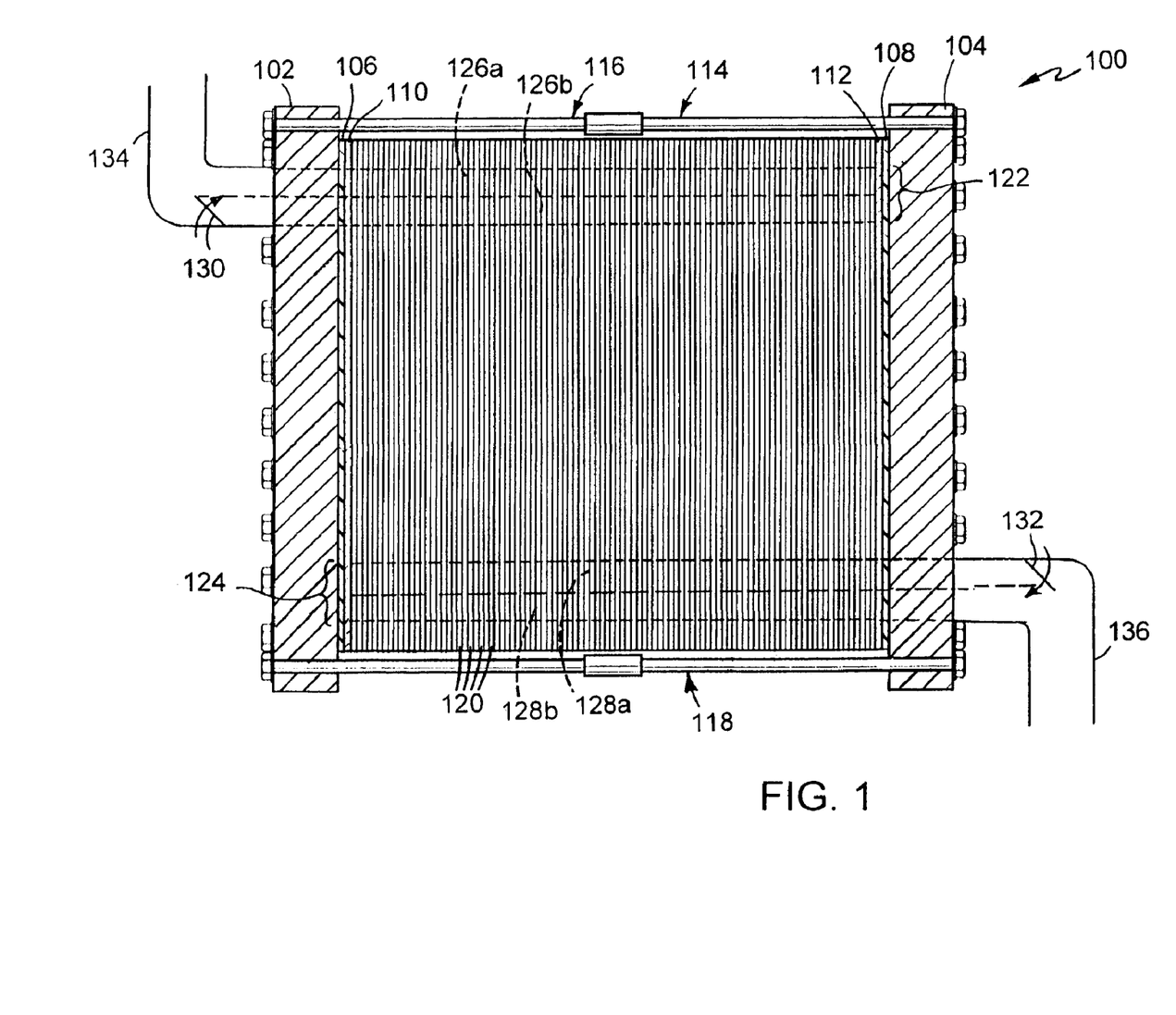
FIG. 1 is a schematic representation of a fuel cell system.

Referring to FIG. 1, a fuel cell system 100 includes left and right end plates 102 and 104, left and right insulation layers 106 and 108, left and right current collector/conductor plates 110 and 112, with a working section 114 in-between. Left and right structural members 116 and 118, two tie-bolts on either side of the working area 114, are used to join the left and right end plates 102 and 104.

The working section 114 includes eighty-eight fuel cells 120, although there may be more or less fuel cells 120 depending on design considerations. Input and output fuel manifolds 122 and 124 supply fuel to, remove fuel from, and otherwise communicate and/or service fuels as desired within the working section 114. Fuel flows into the input fuel manifold 122 from an inlet pipe 134. The fuel then enters the working area 114 from the input fuel manifold 122, flows through each of the fuel cells 120 at least once, and exits the working area 114 through the output fuel manifold 124. The fuel exits the output fuel manifold 124 and into an outlet pipe 136. The fuel may encounter various elements such as a blower after entering the outlet pipe 136.

The input manifold 122 actually includes two manifolds: first and second input manifolds 126a and 126b. Opening and closing an inlet valve 130 redirects a flow path of fuel in the input fuel manifold 122 through the working area 114. With the inlet valve 130 open, fuel flows from the inlet pipe 134 into both the first and second input manifolds 126a and 126b and therefore into the working area 114 from both the first and second input manifolds 126a and 126b. With the inlet valve 130 closed, fuel flows from the inlet pipe 134 into only the first input manifold 126a and therefore into the working area 114 from only the first input manifold 126a.

Similarly, the output manifold 124 also includes two manifolds: first and second output manifolds 128a and 128b, with an outlet valve 132 configured to close the first output manifold 128a.

With both the inlet valve 130 and the outlet valve 132 closed, fuel flows into the first input manifold 126a, through the working area 114, and in to the first output manifold 128a, which is closed at both ends. Thus, the fuel flows from the first output manifold 128a back through the working area 114 and into the second input manifold 126b. The second input manifold 126b is also closed at both ends, so the fuel again enters the working area 114 from the second input manifold 126b and flows in to the second output manifold 128b, from which the fuel flows out of the stack through output pipe 136.

Before discussing the operation of the multiple manifold configuration, we will first provide a few useful details about the design of the individual fuel cells. Then after discussing the operation of the multiple manifold configuration we will provide more details about a particular type of fuel cell.

Figure 2:
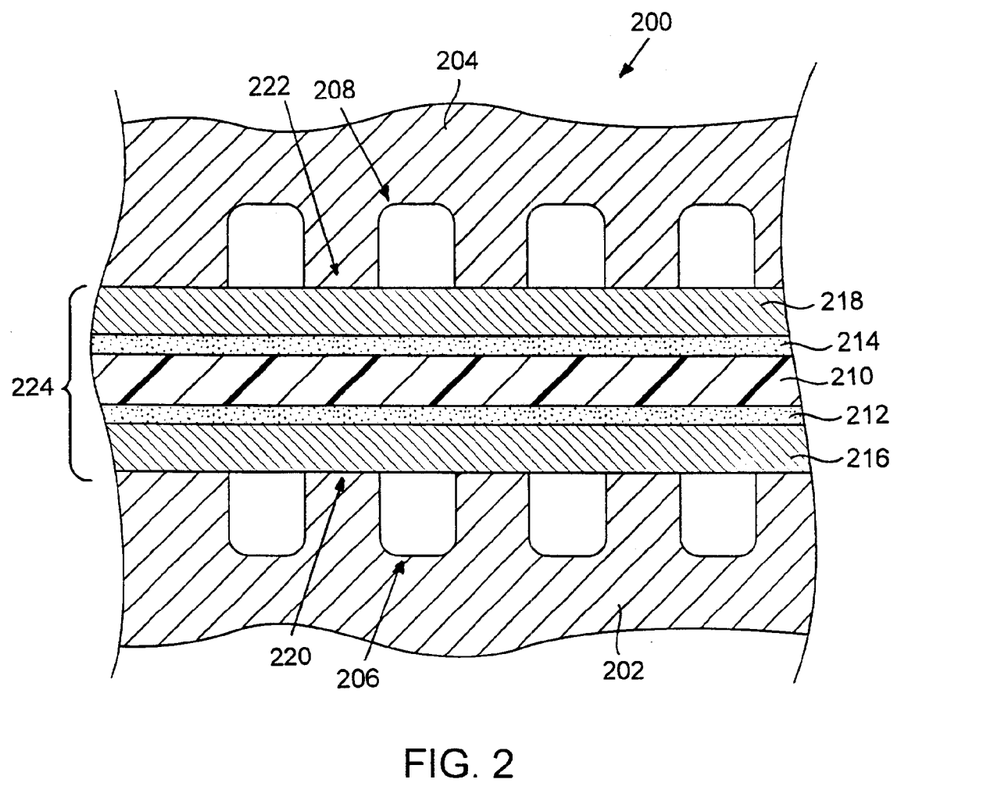
FIG. 2 is a cross-sectional partial view of a single fuel cell.

FIG. 2 illustrates a cross-section of a single fuel cell 200 within the working section 114. It includes an anode fluid flow plate 202, a cathode fluid flow plate 204, anode and cathode flow channels 206 and 208, anode and cathode lands 220 and 222, and a center area 224, each described in more detail below.

The anode fluid flow plate 202 includes a number of flow channels 206 that receive and transmit fuel, e.g., hydrogen gas, and humidification water in vapor and/or liquid form. The cathode fluid flow plate 204 includes a number of flow channels 208 that receive and transmit air, e.g., oxygen gas as oxidant, and product water in vapor and/or liquid form. Adjacent flow channels 206 and 208 are separated by the lands 220 and 222. The lands 220 and 222 serve as electrical contact positions on the corresponding anode and cathode fluid flow plates 202 and 204. The lands 220 and 222 and the fluid flow plates 202 and 204 can be formed with a material such as non-magnetic, austenitic stainless steel or titanium. The fluid flow plates 202 and 204 are described in more detail below with reference to FIGS. 3–4, respectively.

Figure 3:
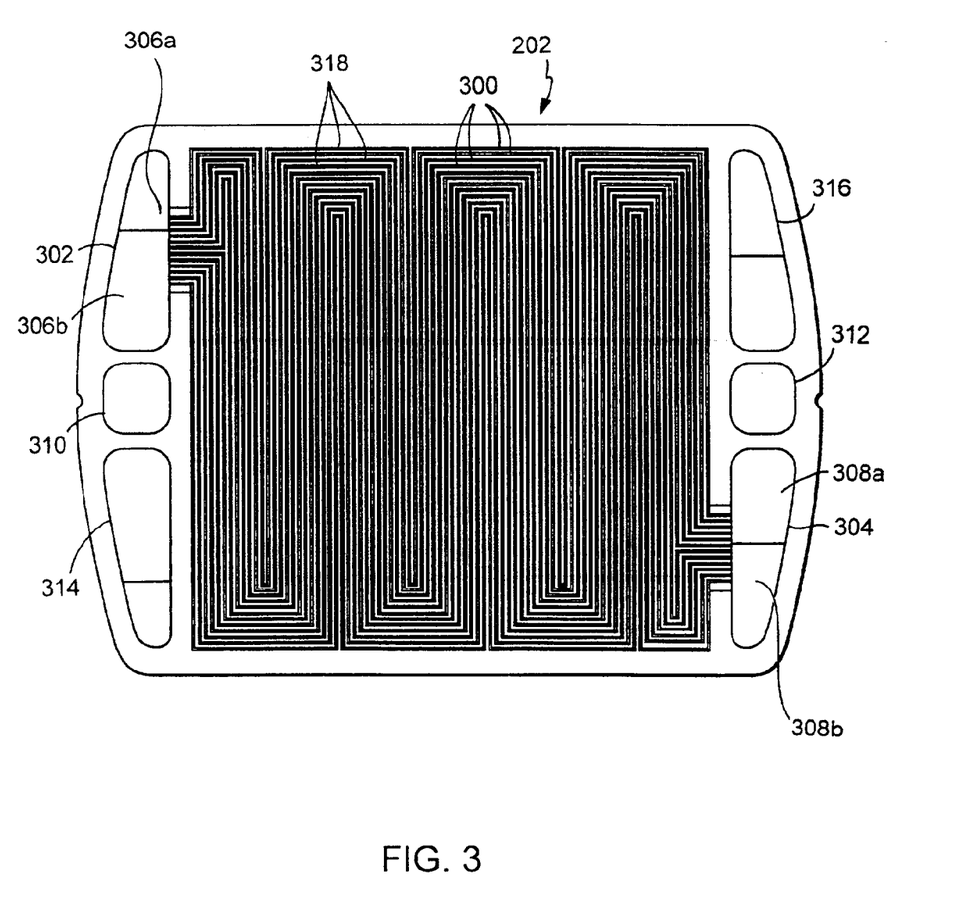
FIG. 3 shows an anode fuel cell plate.

Referring to FIG. 3, the anode fluid flow plate 202 includes one or more substantially parallel and/or generally serpentine fuel flow channel(s) 300 and land(s) 318 (corresponding to the flow channels 206 and the lands 220 in FIG. 2). The fuel flow channels 300 run between inlet fuel and outlet fuel holes 302 and 304. The fuel flow channels 300 carry the fuel and the humidification water through the fuel stack. Twelve flow channels 300 are shown, but the anode fluid flow plate 202 can include more or fewer flow channels 300 depending on design considerations. The anode fluid flow plate 202 also includes inlet and outlet water holes 310 and 312 and inlet and outlet air holes 314 and 316.

The inlet fuel hole 302 and the outlet fuel hole 304 are each actually made up of an equal number of separate inlet holes 306a and 306b and outlet holes 308a and 308b. Here there are two inlet holes 306a and 306b and two outlet holes 308a and 308b. Each of the separate inlet holes 306a and 306b and outlet holes 308a and 308b connects to a corresponding different group of flow channels 300. In this example, the first inlet fuel hole 306a connects to three flow channels 300. The first outlet fuel hole 308a also connects to these three flow channels 300 at the opposite end along with three additional flow channels 300. The second inlet hole 306b connects to the remaining nine flow channels 300 at the inlet fuel hole 302, while a second outlet fuel hole 308b connects to the remaining six flow channels 300 at the outlet fuel hole 304.

Figure 4:
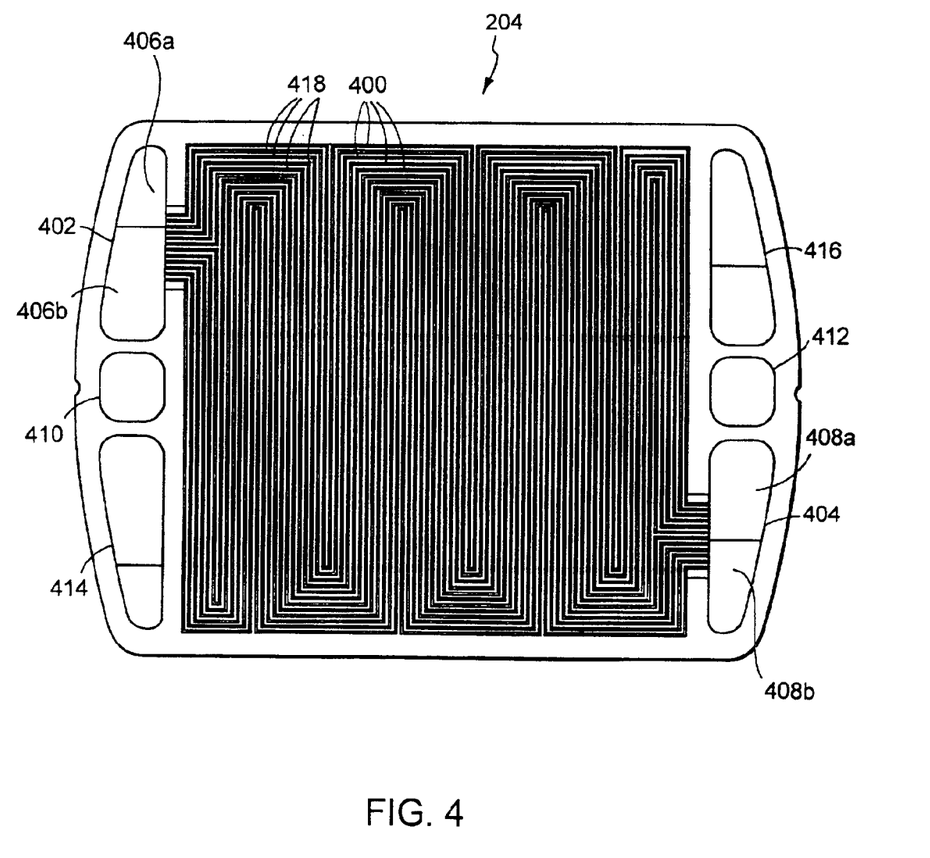
FIG. 4 shows a cathode fuel cell plate.

Referring to FIG. 4, the cathode fluid flow plate 204 includes one or more substantially parallel and/or generally serpentine air flow channel(s) 400 and land(s) 418 (corresponding to the flow channels 208 and the lands 222 in FIG. 2). The air flow channels 400 run between inlet and outlet air holes 402 and 404. The air flow channels 400 carry the oxidant gas and the product water through the fuel stack. The inlet air hole 402 and the outlet air hole 404 are each actually made up of two separate inlet holes 406a and 406b and two separate outlet holes 408a and 408b as described above with reference to the anode fluid flow plate's separate inlet holes 306a and 306b and outlet holes 308a and 308b (see FIG. 3). Twelve flow channels 400 are shown, but the cathode fluid flow plate 204 can, depending on design considerations, include more or less channels (and corresponding lands) equal to the number of flow channels on the anode fluid flow plate 202 (see FIG. 2). The cathode fluid flow plate 204 also includes inlet and outlet water holes 410 and 412 and inlet and outlet fuel holes 414 and 416.

When a plurality of the anode fluid flow plates 202 (see FIG. 3) and a plurality of the cathode fluid flow plates 204 (see FIG. 4) are stacked on one another, the inlet fuel holes 302 and 414 align to form the input fuel manifold 122 (see FIG. 1) and the outlet fuel holes 304 and 416 align to form the output fuel manifold 124 (see FIG. 1). Similarly, the inlet air holes 314 and 402 align to form an input air manifold and the outlet air holes align to form an output air manifold. The inlet water holes 310 and 410 and the outlet water holes 312 and 412 align to form input and output water manifolds, respectively. (A coolant fluid flow plate may be located between the anode and cathode fluid flow plates 202 and 204, and the coolant fluid flow plate includes holes in the appropriate places to accommodate the fuel, air, and water manifolds.)

Figure 5:
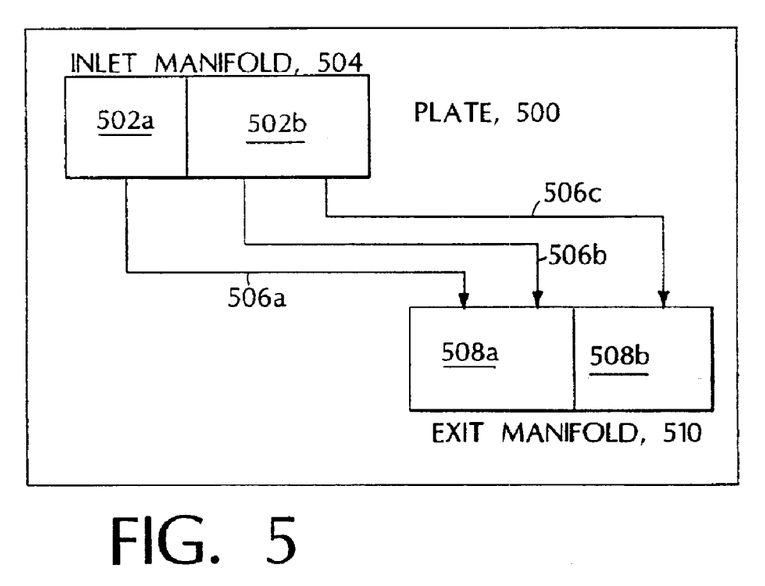
FIG. 5 is a schematic representation of flow paths in a fuel cell plate with an open manifold configuration.

Referring to FIG. 5, flow paths through an anode fluid flow plate 500 are shown in an open manifold configuration. FIG. 5 is a simplified schematic drawing meant to illustrate the operation of the flow paths of the anode fluid flow plate 500. The anode fluid flow plate 500 has the inlet valve 130 and the outlet valve 132 for the input fuel manifold 122 and the output fuel manifold 124, respectively, in open positions (see FIG. 1). Thus, inlet holes 502a and 502b form part of a single inlet fuel manifold 504 and outlet holes 508a and 508b form part of a single outlet manifold 510. Fuel enters the anode fuel cell plate 500 through the inlet fuel manifold 504 (all inlet holes 502a and 502b) and flows through flow channels 506a–506c in the anode fuel cell plate 500. Then, the fuel exits the anode fuel cell plate 500 through all outlet holes 508a and 508b of the exit fuel manifold 510. In this way, the anode fuel cell plate 500 performs as a three channel, single pass design.

Figure 6:
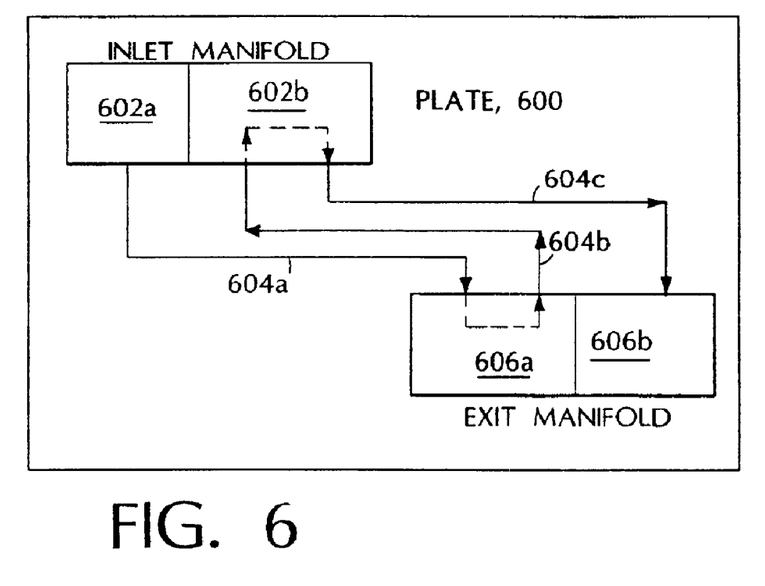
FIG. 6 is a schematic representation of flow paths in a fuel cell plate with a closed manifold configuration.

Referring to FIG. 6, flow paths through an anode fluid flow plate 600 are shown in a closed manifold configuration. The anode fluid flow plate 600 has the inlet valve 130 and the outlet valve 132 for the input fuel manifold 122 and the output fuel manifold 124, respectively, in closed positions (see FIG. 1). Thus, inlet holes 602a and 602b form part of separate inlet manifolds and outlet holes 606a and 606b form part of separate outlet manifolds. Fluid enters the anode fuel cell plate 600 through the first inlet hole 602a and flows through a first flow channel 604a to the first outlet hole 606a. With the outlet valve 132 closed, the manifold formed in part by the first outlet hole 606a is closed at both ends, i.e., it is a sealed plenum through which the fuel cannot exit from the fuel cell stack. Instead, the fuel flows back into a second flow channel 604b across the fuel cell and into the second inlet hole 602b. With the inlet valve 130 also in a closed position, the manifold formed in part by the second inlet hole 602b is closed at both ends, i.e., it is a sealed plenum through which the fuel cannot exit the fuel cell stack, so the fluid flows through a third flow channel 604c to the second outlet hole 606b, through which the fluid exits the anode fuel cell plate 600. In this way, the anode fuel cell plate 600 acts as a single channel, three pass design.

The closed manifold configuration of the anode fluid flow plate 600 produces a higher pressure drop than the pressure drop produced when fuel flows through the open manifold configuration of the anode fluid flow plate 500 (see FIG. 5). The higher pressure drop is about three to five times higher than the pressure drop produced in the anode fluid flow plate 500 given that the flow path is about three times longer and has more bends.

In addition, at each of the sealed plenums formed in part by the first outlet hole 606a and the second inlet hole 602b, water tends to drop out of the flow path through the fuel cells. Therefore, an added advantage of this configuration is that less water passes through a subsequent flow channel, e.g., third flow channel 604c, than in a previous flow channel, e.g., first flow channel 604a or second flow channel 604b.

Each one of the flow channels 506a–506c (see FIG. 5) and 604a–604c (see FIG. 6) can in fact represent multiple individual flow channels in an actual implementation. Similarly, there may be more inlet fuel holes 502a and 502b (see FIG. 5) and 602a and 602b (see FIG. 6) and more outlet holes 508a and 508b (see FIG. 5) and 608a and 608b (see FIG. 6) in an actual implementation, thereby increasing the number of times that fuel may pass through the fuel cell stack.

The discussion of FIGS. 5–6 illustrated flow through anode fluid flow plates, but the discussion can also apply to cathode fluid flow plates (with air flowing instead of fuel).

Having discussed the operation of the multiple manifold configuration, we will now provide more details about a particular type of fuel cell.

Referring back to the partial view 200 in FIG. 2 of the fuel cell 120, the center area 224 includes a membrane or solid electrolyte 210, anode and cathode catalysts 212 and 214, and anode and cathode gas diffusion layers 216 and 218, each described in more detail below. The solid electrolyte 210 includes a solid polymer, e.g., a solid polymer ion exchange membrane, such as a solid polymer proton exchange membrane, e.g., a solid polymer containing sulfonic acid groups. Such membranes are commercially available from E. I. DuPont de Nemours Company (Wilmington, Del.) under the trademark NAFION. Alternatively, the electrolyte 210 can be prepared from the commercial product GORE-SELECT, available from W. L. Gore & Associates (Elkton, Md.).

Together, the solid electrolyte 210 and the catalysts 212 and 214 form a membrane electrode assembly (MEA). The anode catalyst 212 includes material capable of interacting with molecular hydrogen to form protons and electrons. Such materials include, for example, platinum, platinum alloys, and platinum dispersed on carbon black. The catalytic material can be dispersed in one or more solvents, e.g., isopropanol, to form a suspension. The suspension is then applied to the surfaces of the solid electrolyte 210 that face the gas diffusion layers 216 and 218, and the suspension is then dried. Alternatively, the suspension can be applied to the surfaces of the gas diffusion layers 216 and 218 that face the solid electrolyte 210, and the suspension is then dried. The method of preparing the catalyst 212 may further include the use of heat, temperature, and/or pressure to achieve bonding.

The catalyst 214 on the cathode side is formed of a material capable of interacting with molecular oxygen, electrons, and protons to form water. Examples of such materials include platinum, platinum alloys, and noble metals dispersed on carbon black. The catalyst 214 can then be prepared as described above with respect to the catalyst 212.

The gas diffusion layers 216 and 218 are formed of a material that is both gas and liquid permeable material so that the reactant gases, e.g., molecular hydrogen and molecular oxygen, and products, e.g., water, can pass therethrough. In addition, the gas diffusion layers 216 and 218 should be electrically conductive so that electrons can flow from the catalyst 212 to the flow field plate 202 and from the flow field plate 204 to the catalyst 214.

While certain embodiments of the invention, as well as their principals of operation, have been disclosed herein, the invention is not limited to these embodiments or these principals of operation. Other embodiments are in the claims.

What is claimed is:

1. A fuel cell electrode comprising:
   a plate having a front surface and a back surface, the front surface of the elate having a plurality of open gas distributions channels;
   a plurality of gas delivery holes formed through the plate including at least a first gas delivery hole and a second gas delivery hole; and
   a plurality of gas exhaust holes formed through the plate including at least a first gas exhaust hole and a second gas exhaust hole, wherein:
      at least a first one of the plurality of open gas distribution channels has a first end connected to the first gas delivery hole and a second end connected to the first gas exhaust hole and not connected to the second gas exhaust hole,
      at least a second one of the plurality of open gas distribution channels has a first end connected to the second gas delivery hole and a second end connected to the second gas exhaust hole and not connected to the first gas exhaust hole, and
      at least a third one of the plurality of open gas distribution channels has a first end to the second gas delivery hole and a second end connected to the first gas exhaust hole and not connected to the second gas exhaust hole.

2. The fuel cell electrode of claim 1 wherein the plate includes an equal number of gas delivery holes and gas exhaust holes.

3. The fuel cell electrode of claim 1 wherein the plate includes two gas delivery holes and two gas exhaust holes.

4. The fuel cell electrode of claim 1 further comprising:
   a second plate having a front surface and a back surface, the back surface of the second plate having a plurality of open air distributions channels,
   a plurality of air delivery holes including at least a first of air delivery hole and a second air delivery hole; and
   a plurality of air exhaust holes formed through the second plate including at least a first air exhaust hole and a second of air exhaust hole, wherein
   at least a first one of the plurality of air distribution channels has a first end connected to the first air delivery hole and a second end connected to the first air exhaust hole and not connected to the second air exhaust hole,
   at least a second one of the plurality of air distribution channels has a first end connected to the second air delivery hole and a second end connected to the second air exhaust hole and not connected to the first air exhaust hole, and at least a third one of the plurality of air distribution channels has a first end connected to the second air delivery hole and a second end connected to the first air exhaust hole and not connected to the second air exhaust hole.

5. The fuel cell electrode of claim 4 wherein the second plate includes an equal number of air delivery holes and air exhaust holes.

6. The fuel cell electrode of claim 4 wherein the second plate includes two air delivery holes and two air exhaust holes.

7. The fuel cell electrode of claim 1 wherein the front surface serves as an anode side of the plate.

8. The fuel cell electrode of claim 1 wherein the front surface serves as a cathode side of the plate.

9. A fuel cell system comprising:

a plurality of fuel cells stacked together, each having a first electrode, a second electrode, and a membrane disposed between the first and second electrodes, wherein each first electrode includes a plurality of gas distribution channels on a surface thereof;

a plurality of gas delivery manifolds, each of which is connected to the plurality of channels of each of the plurality of first electrodes; and a plurality of gas exhaust manifolds, each of which is connected to the plurality of channels of each of the plurality of first electrodes, wherein on the first electrode of each of the plurality of fuel cells, at least a first one of the plurality of gas distribution channels has a first end connected to a first gas delivery manifold and a second end connected to a first gas exhaust manifold and not connected to a second gas exhaust manifold, at least a second one of the plurality of gas distribution channels has a first end connected to a second gas delivery manifold and a second end connected to the second gas exhaust manifold and not connected to the first gas exhaust manifold, and at least a third one of the plurality of gas distribution channels has a first end connected to the second gas delivery manifold and a second end connected to the first gas exhaust manifold and not connected to the second gas exhaust manifold.

10. The fuel cell system of claim 9 wherein the fuel cell system includes an equal number of gas delivery manifolds and gas exhaust manifolds.

11. The fuel cell system of claim 9 wherein the fuel cell system includes two gas delivery manifolds and two gas exhaust manifolds.

12. The fuel cell system of claim 9 further comprising a gas delivery valve connected to an outermost one of the plurality of fuel cells and configured to open and close over a portion of the plurality of gas delivery manifolds.

13. The fuel cell system of claim 9 further comprising a gas exhaust valve connected to an outermost one of the plurality of fuel cells and configured to open and close over a portion of the plurality of gas exhaust manifolds.

14. The fuel cell system of claim 9 further comprising:

a plurality of air delivery manifolds, each of which is connected to a plurality of air distribution channels on a surface of each of the plurality of second electrodes including at least a first of air delivery manifold and a second of air delivery manifold; and a plurality of air exhaust manifolds including at least a first of air exhaust manifold and a second of air exhaust manifold, each of which is connected to the plurality of air distribution channels of each of the plurality of second electrodes, wherein on the second electrode of each of the plurality of fuel cells, at least a first one of the plurality of air distribution channels has a first end connected to the first air delivery manifold and a second end connected to the first air exhaust manifold and not connected to the second air exhaust manifold, at least a second one of the plurality of air distribution channels has a first end connected to the second air delivery manifold a second end connected to the second air exhaust manifold and not connected to the first air exhaust manifold, and at least a third one of the plurality of air distribution channels has a first end connected to the second air delivery manifold a second end connected to the first air exhaust manifold and not connected to the second air exhaust manifold.

15. The fuel cell system of claim 14 wherein the fuel cell system includes an equal number of air delivery manifolds and air exhaust manifolds.

16. The fuel cell system of claim 14 wherein the fuel cell system includes two air delivery manifolds and two air exhaust manifolds.

* * * * *